G. A. LUTZ & C. C. SIBLEY.
RECEPTACLE OR THE LIKE FOR CONDUITS.
APPLICATION FILED OCT. 26, 1905.

917,325.  Patented Apr. 6, 1909.

Witnesses
Inventors
G. A. Lutz & C. C. Sibley
By their Attorney

UNITED STATES PATENT OFFICE.

GEORGE A. LUTZ, OF NEW YORK, N. Y., AND CLARENCE C. SIBLEY, OF PERTH AMBOY, NEW JERSEY.

RECEPTACLE OR THE LIKE FOR CONDUITS.

No. 917,325.    Specification of Letters Patent.    Patented April 6, 1909.

Application filed October 26, 1905. Serial No. 284,559.

*To all whom it may concern:*

Be it known that we, GEORGE A. LUTZ and CLARENCE C. SIBLEY, citizens of the United States, residing, respectively, in New York city, borough of Brooklyn, New York, and Perth Amboy, Middlesex county, New Jersey, have invented certain new and useful Improvements in Receptacles or the Like for Conduits, of which the following is a specification.

This invention relates to improvements in means for supporting receptacles, rosettes, and similar devices in connection with conduits for electric conductors, and the invention comprises the novel details of improvement and arrangements of parts that will be more fully hereinafter set forth and then pointed out in the claims.

Figure 1:
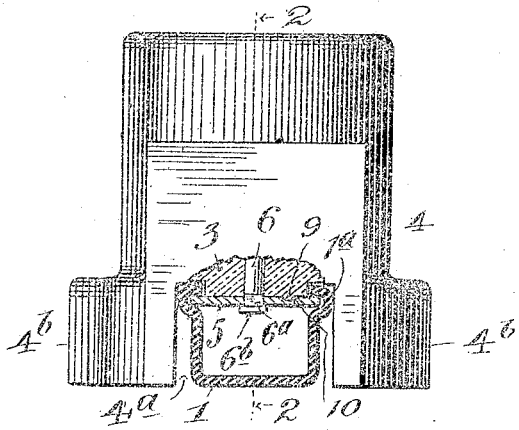
Figure 2:
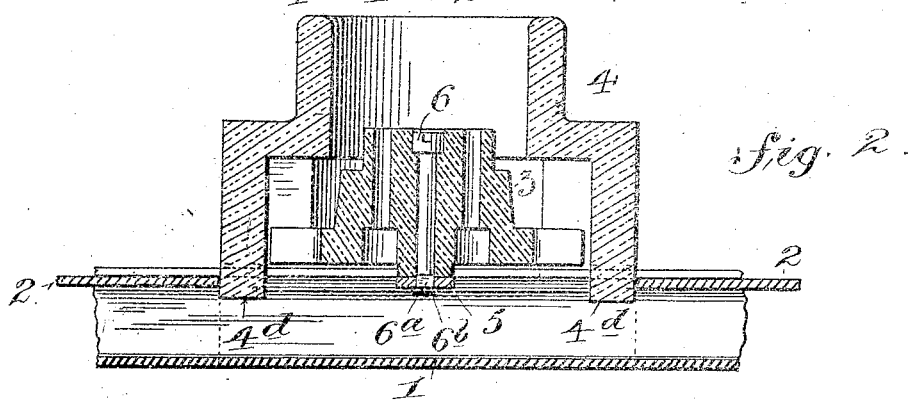
Figure 3:
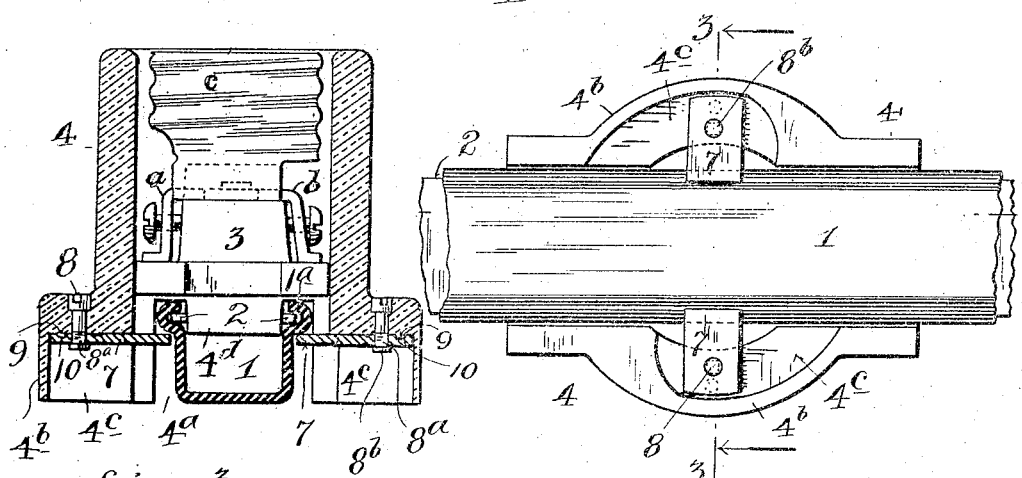
Figure 4:
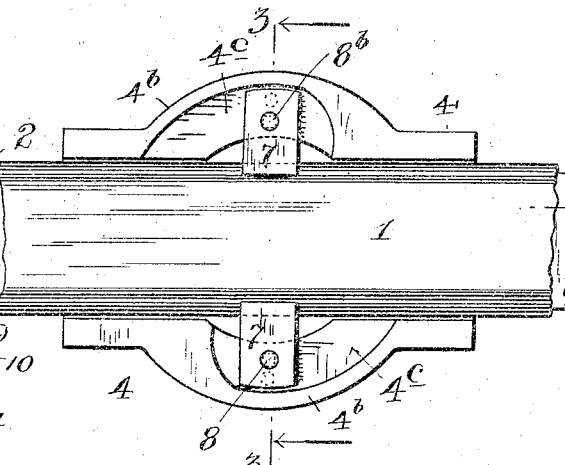

Reference is to be had to the accompanying drawings forming part hereof, wherein, Figure 1 is an end view, partly broken, of a receptacle mounted upon a conduit in accordance with this invention, Fig. 2 is a longitudinal section thereof, substantially on the line 2, 2, in Fig. 1, Fig. 3 is a cross section substantially on the line 3, 3, in Fig. 4, looking in the direction of the arrows, and Fig. 1 is an inverted plan view of the construction shown in Fig. 3.

Similar characters of reference indicate corresponding parts in the several views.

The numeral 1 in the drawings indicates a conduit of the class having one side open and provided with opposed grooved portions or projections $1^a$, receiving a removable cover or covers 2, and the receptacle or the like that is mounted upon the conduit is shown comprising a base 3 and a cap 4 which may generally be of well known construction. The base 3 shown is of the class adapted to be mounted upon the conduit and the cap 4 is provided with a gain or recess $4^a$ opening through the bottom and opposite ends thereof, so that the side members $4^b$ of the cap may straddle the conduit while the cap incloses the adjacent portions of the conduit as well as the base 3. The base may be provided with suitable electric contacts indicated at *a, b*, and a screw shell *c* for receiving a socket, lamp, wires, etc. in any suitable manner. The means shown in Figs. 1, 2 and 3 for detachably securing the base 3 upon the conduit 1 comprise a strap or bar 5, shown attached to the base by a screw, rod or the like 6, and adapted to extend transversely beneath the base and have its ends project into grooves $1^a$ of the conduit.

When the base is to be fastened on the conduit the strip 5 is adjusted substantially lengthwise of the conduit and then after the base is placed upon the latter the member 6 is turned to cause the ends of the strip 5 to enter the grooves $1^a$ of the conduit to hold the base in place. The rod or screw 6 is shown provided with an angular portion $6^a$ entering a correspondingly shaped portion of strip 5 and having the end upset at $6^b$ whereby the strip 5 is firmly held upon the base and will turn with the rod 6, although the latter could be provided with threads meshing with corresponding threads in the part 5 if desired.

The cap or outer member 4 in Figs. 3 and 4 is shown held upon the conduit in a manner substantially similar to the means for holding the base thereon, the arrangement being as follows:—On the under side of the cap, as to its extensions $4^b$, are attached strips or fingers 7 that are adapted to engage the grooved or extended portions $1^a$ of conduit 1, there being one such strip 7 on each side of the cap and thus on opposite sides of the conduit, as shown in Figs. 3 and 4, and for convenience the strips 7 are located in recesses $4^c$ formed in the under side of the cap or in its extensions $4^b$. The strips 7 are shown carried by rods, screws or the like 8 which may have angular portions at $8^a$ engaging corresponding holes in the strips 7 and provided with heads $8^b$ whereby the strips are firmly connected with said rods 8 to be turned thereby, or said rods 8 may be in the form of screws or the like, meshing in threaded apertures in the strips 7. When the cap is to be applied upon the conduit the strips 7 are turned into the recesses $4^c$, the cap is placed over the conduit, and then the strips 7 turned into the position shown in Fig. 4 to lie against the grooved portions $1^a$ of the conduit, whereby the cap is maintained in position thereon.

Any suitable means may be provided if desired, to hold the strips 7 from turning away from engagement with the conduit 1, such as by causing the screw 8 to draw the strips 5 or 7 firmly against the conduit, but in the arrangements shown the base 3 and the cap 4 are provided with lugs or teats 9 adapted to enter sockets or recesses 10 in the parts 5 and 7, the parts 9 and 10 being in such position as to mesh when the strip 5 is turned crosswise in the grooves 1ª, as in Fig. 1, or when the strips 7 are turned under the grooved portions 1ª, as in Fig. 3, whereby said strips are kept from twisting out of place.

The cap 4 at its ends is shown provided with lugs 4ᵈ that project into the conduit 1 in line with the covers 2 to limit the inward movement of the covers toward or into the cap.

The base 3 and cap 4 may be made of insulating material, such as porcelain, in which case by making the strips 5 and 7 of metal attached to such insulating material short circuiting of such strips to the electrical connections will not occur.

While the improvements herein are shown applied to the members of a receptacle for electric fixtures, it will be understood that the same may be used in connection with rosettes and other analogous devices to be detachably connected with or mounted upon conduits generally, and this invention is not limited to the details of construction and arrangements shown and described.

Having now described our invention what we claim is:

1. The combination of a conduit, with a fitting for electric connections, a strip, and a screw connecting the strip with the fitting to enable the strip to engage the side walls of the conduit for holding the fitting thereto.

2. The combination of a conduit, with a base provided with electric fittings, a strip engaging the sides of the conduit, and means rotatively connecting the strip with the base whereby the strip may be rotated to engage the conduit.

3. The combination of a conduit provided with grooves, with a base provided with a movable member located between and adapted to engage the grooves of the conduit.

4. The combination of a conduit provided with grooves, a base having a strip located between and adapted to engage the grooves of the conduit, and means for holding the strip upon the base for engagement with the conduit.

5. The combination of a conduit provided with grooves, a base, a strip located between and adapted to engage the grooves of the conduit, and means connecting the strip with the base, whereby the strip may be held in engagement with the grooves of the conduit.

6. The combination of a conduit provided with grooves, with a base, a strip located between and adapted to engage said grooves, means for movably connecting the strip with the base, and means for locking the strip to the base.

7. The combination of a conduit, with a base upon the conduit, a cap fitting over the base and conduit, strips connected with the cap and engaging the side walls of the conduit to hold the cap thereto, and screws connecting the strips with the cap.

8. The combination of a conduit, with a base upon the conduit, a cap fitting over the base and conduit, and strips adjustably carried by the cap and in holding engagement with the side walls of the conduit.

9. The combination of a conduit, with a cap, strips carried by the cap on opposite sides of and without the conduit to engage the conduit on opposite sides, and screws connecting the strips with the cap.

10. The combination of a conduit, with a cap having a gain to receive the conduit and movable members carried by the cap on opposite sides of the gain and the conduit to engage the latter.

11. The combination of a conduit provided with projecting portions, with a cap having strips on opposite sides of and without the conduit to engage said portions of the conduit, and screws adjustably connecting the strips with the cap.

12. The combination of a conduit provided with projecting portions, with a cap having a gain to receive the conduit, strips carried by the cap to engage the projecting portions of the conduit, and screws connecting the strips with the cap.

13. The combination of a conduit having bent portions, with a cap, strips carried by the cap on opposite sides of and without the conduit to engage the bent portions of the conduit, and means connecting the strips with the cap for movably holding the strips thereto.

14. The combination of a conduit having projecting portions, with a cap, strips carried by the cap to engage the projecting portions of the conduit, means connecting the strips with the cap for movably holding the strips thereto, and means for locking the strips to the cap.

15. The combination of a conduit provided with projecting portions, with a cap having recesses on its under surface, and movable members held in said recesses to engage the projecting portions of the conduit.

16. The combination of a conduit, with a base having a movable member to engage the conduit, and a cap over the base and having a movable member to engage the conduit.

17. The combination of a conduit having bent portions, with a base provided with a movable member located between and adapted to engage the bent portions of the conduit, and a cap over the base and having movable members to engage the bent portions of the conduit.

18. A cap for an electric fitting having strips on opposite sides, a conduit engaged by said strips and screws adjustably connecting the strips with the cap.

19. A cap for an electric fitting having a gain to receive a conduit and provided with adjustable members on opposite sides of the gain to engage the side walls of a conduit.

20. A cap for an electric fitting having a gain to receive a conduit and provided with recesses on its under surface, and movable members carried in said recesses arranged to project into the gain to engage a conduit combined with a conduit to co-act with said members.

GEO. A. LUTZ.
CLARENCE C. SIBLEY.

Witnesses:
T. F. BOURNE,
M. HOLLINGSHEAD.